United States Patent Office 3,840,653
Patented Oct. 8, 1974

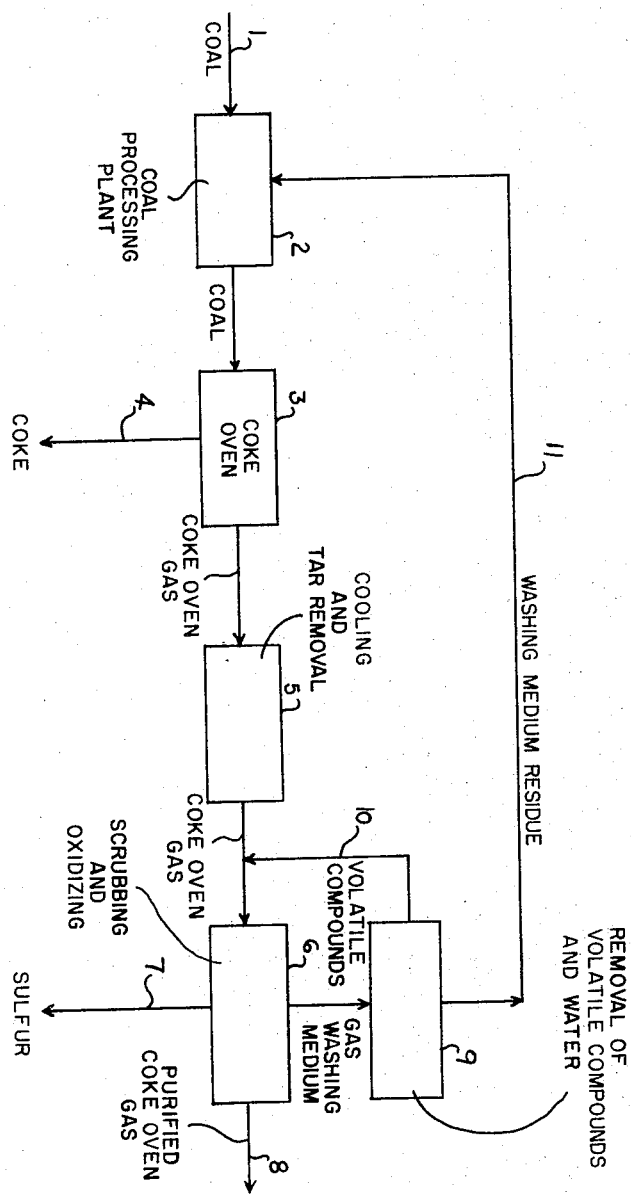

3,840,653
PROCESS FOR ELIMINATING THE FORMATION OF WASTE LIQUOR DURING THE DESULFURIZATION OF COKE OVEN GAS
Peter Diemer, Gerhard Preusser, and Paul Radusch, Essen, Germany, assignors to Heinrich Koppers Gesellschaft mit beschrankter Haftung, Essen, Germany
Filed Nov. 7, 1972, Ser. No. 304,502
Claims priority, application Germany, Nov. 19, 1971, P 21 57 365.9
Int. Cl. C01b 17/04
U.S. Cl. 423—573
8 Claims

ABSTRACT OF THE DISCLOSURE

Hydrogen sulfide is removed from coke oven gas by washing the gas with a liquid ammoniacal washing medium. The washing medium containing the hydrogen sulfide is then treated to oxidize the hydrogen sulfide to elemental sulfur. Air in the presence of a catalyst is preferably used as the oxidizing agent. The washing medium, after oxidation of the hydrogen sulfide and separation of the elemental sulfur, is recycled to remove hydrogen sulfide from other coke oven gas. The recycled washing medium contains contaminants such as sulfates, thiosulfates, polythionates and the like. A portion of the recycled washing medium containing these contaminants is withdrawn from the recycle stream and replaced with fresh uncontaminated liquid washing medium. The withdrawn washing medium containing the contaminants is subjected to an elevated temperature sufficient to volatilize selected volatile compounds. The volatile compounds are separated from the remaining liquid residue and are mixed with unwashed coke oven gas. The remaining liquid residue from the withdrawn portion of the contaminated liquid washing medium is concentrated by evaporating at least a portion of the water and the thickened residue is added to the coal to be coked. A substantial portion of the sulfur compounds in the liquid residue added to the coal are converted during the coking process to hydrogen sulfide and only a relatively small portion of the hydrogen sulfide reacts chemically with the coke formed during the coking process. A substantial portion of the thiocyanates in the residue are, it is believed, converted to nitrogen, ammonia and carbon dioxide with little, if any, of the thiocynates forming hydrogenic acid.

BACKGROUND OF THE INVENTION

1. Field of the Invention

This invention relates to a process for treating a liquid washing medium contaminated with sulfur compounds and more particularly to a process for eliminating the formation of waste liquor during the desulfurization of coke oven gas.

2. Description of the Prior Art

The liquid processes for desulfurizing coke oven gas have proven satisfactory in removing hydrogen sulfide from the coke oven gas. In the liquid processes, the hydrogen sulfide is first washed from the gas with a liquid washing medium and the hydrogen sulfide in the liquid phase is then preferably oxidized to elemental sulfur. The oxidation of the hydrogen sulfide does not, however, result in quantitative yields of elemental sulfur and side reactions during oxidation produce small amounts of sulfur compound contaminants such as sulfates, thiosulfates and polythionates. Continued recycle of the liquid washing medium during the desulfurization process increases the sulfur compound contaminants produced by the side reactions in the liquid washing medium to the extent that the washing efficiency of liquid washing medium is reduced substantially. Also, a portion of the elemental sulfur formed by the oxidation process is converted with the hydrocyanic acid present to thiocyanates.

To prevent an undesirably high concentration of sulfur compound contaminants in the liquid washing medium, a small portion of the liquid washing medium is removed from the recycled liquid and replaced with fresh, uncontaminated liquid washing medium. The contaminated washing liquid removed from the process, also referred to as spent washing liquid, contains oxygen consuming and difficultly biodegradable materials and cannot, therefore, be discharged into rivers or streams. It is necessary to process the spent washing liquid to remove the contaminants before the liquid can be discharged into the rivers and streams. This processing is technically difficult and very expensive. There is a need for a process to desulfurize coke oven gases without accumulating spent washing liquid.

SUMMARY OF THE INVENTION

In accordance with the present invention, contaminated or spent liquid washing medium is first treated to separate gas through a liquid washing medium in the first stage. The residue of the minor portion of liquid washing medium remaining is preferably thickened and mixed with the coal to be charged to the coke oven. With the above described process, the contaminated washing liquid is eliminated without expensive processing.

Accordingly, the principal object of this invention is to provide a process for treating a liquid washing medium contaminated with sulfur compounds.

Another object of this invention is to provide a process for eliminating the spend liquid washing medium without extensive processing.

These and other objects of this invention will be more completely disclosed and described in the following specification, accompanying drawing and appended claims.

DESCRIPTION OF THE DRAWING

The figure is a diagrammatic representation of the method and process for eliminating the formation of waste liquor during the desulfurization of coke oven gas.

DESCRIPTION OF THE PREFERRED EMBODIMENTS

It has now been found that the formation of waste liquor with harmful materials therein can be prevented during the desulfurization of coke oven gas with a liquid ammonia washing medium by the following process. First, the hydrogen sulfide is removed from the coke oven gas by washing the coke oven gas with a liquid ammonia washing medium in the first stage. Thereafter, the hydrogen sulfide in the washing medium is oxidized to elemental sulfur in a second stage by subjecting the washing medium containing the hydrogen sulfide to air in the presence of a catalyst. A portion of the washing medium is withdrawn from the second stage before the washing medium is recycled to the first stage. The washing medium withdrawn is replaced by a fresh washing medium. The withdrawn washing medium is then subjected to an elevated temperature to volatilize the volatile compounds therefrom. The volatile compounds are separated and added to the coke oven gas before the coke oven gas is washed in the first stage. The remaining liquid residue from the withdrawn portion of the washing medium is then added to the coal charge to be coked.

The process of the present invention has the advantage that the desulfurization of the coke oven gas with the liquid washing media does not result in the accumulation of any detrimental waste liquors which must be first processed before being discharged into the rivers and streams. It has been surprisingly shown that the quality of the obtained coke is not impaired by the addition of the liquid residue from the washing liquid to the coking coal. Comparative analyses have shown that the sulfur content of the coke increases, if at all, only slightly in the operation of the process of the present invention. For example, a maximum increase of only about 0.05% to 0.1% by weight sulfur on coking Ruhr coals which yield coke containing about 1% by weight sulfur. A coke with a correspondingly lower sulfur content from coals having reduced sulfur. It is apparent that only a portion of the hydrogen sulfide which is formed in the thermal dissociation of the sulfurous salts in the coke oven reacts chemically with the coke. The major portion of hydrogen sulfide goes into the gas from which it is then removed by the ammoniacal washing media and is thereafter converted to elemental sulfur by oxidation, whereby the yield of sulfur is considerably increased.

Furthermore, it has been surprisingly shown that the present thiocyanates practically do not form hydrocyanic acid in the dissociation in the coke oven; but they are preferably converted to nitrogen, ammonia and carbon dioxide. If rather large amounts of hydrocyanic acid were formed, which was not to be excluded in the dissociation of the thiocyanates under the conditions prevailing in the coke oven, the level of hydrocyanic acid in the coke oven gas together with the level of thiocyanates in the washing liquid would rise continuously during the operation whereby the washing effect would decline.

The amounts of washing liquid withdrawn from the washing medium circuit can be maintained within relatively low limits in the process of the present invention without formation of an undesirably high concentration of sulfates, thiosulfates, polythionates, or thiocyanates in the washing medium.

This is apparent from the following numerical values which were determined in a Japanese and Ruhr industrial plants.

About 350 m.$^3$ of coke oven gas at atmospheric pressure and temperature were obtained per metric ton of dry coal (Ruhr coking coal) during the coking operation. For this amount of gas about 3 to 10 m.$^3$ of washing (ammoniacal liquor) were required for the washing and in longer operating periods a continuous withdrawal of an average of about 0.01 m.$^3$ of washing material per metric ton of coal was required to maintain the contaminants in the recycled washing liquid within desirable limits. The addition of the liquid residue after removal of the volatile compounds to the coking coal did not materially affect the coke properties. Depending on the property of the coal, the amounts of the liquid residue from the washing liquid added to the coking coal could be increased or decreased and remain within desirable limits of contaminants in the washing liquid.

To maintain the moisture content of the to be coked coal as low as possible, it has proven to be suitable to remove a portion of the water from the withdrawn washing liquid by thermal treatment before the addition to the coking coal. The withdrawn amount of washing medium is replaced by fresh washing medium.

The desulfurization of the coke oven gas is effected in a manner known per se. For example, ammoniacal liquor in which concentrations from about 10 to 30 grams of free ammonia per liter of washing medium is provided as washing medium.

The washing out of hydrogen sulfide takes place at normal temperatures, i.e. at about 15 to 30° C. Coke oven gas and washing medium flow concurrently.

Quinone and its derivatives, e.g., hydroquinone, naphthoquinone, anthroquinone, and their sulfo acids, have proven to be effective as catalysts for the oxidation of the washed out hydrogen sulfide with air. The oxidation can take place in the same direction of flow or countercurrently.

The liquid portion removed from the washing medium circuit is heated to a boiling temperature—for example in a column—before addition to the coking coal to remove the volatile compounds, particularly the ammonia and carbon dioxide, which are then added to the coke oven gas before washing in the first phase.

The obtained liquid residue is suitably thickened by evaporation of water.

The operating method conforming to the invention is explained in the attached diagram.

Coking coal is delivered via a conveyor belt 1 to the coal processing plant 2 and then to the coke oven 3. The obtained coke is discharged at 4.

The coke oven gas is then brought to normal temperature in an equipment 5 for cooling and removal of tar and it is additionally treated in an installation 6 for scrubbing out and oxidizing the hydrogen sulfide. The obtained elemental sulfur is discharged at 7 and the purified coke oven gas at 8.

A portion of the spent washing medium goes from the washing installation 6 into a column 9 for expelling the volatile compounds and water vapor. The volatile components are returned through line 10 into the washing installation 6, whereas the liquid, thickened, washing medium residue, is added by means of line 11 to the coking coal in the processing equipment 2.

The following example is illustrative of the process. Example: A coke oven gas which was obtained in a Japanese coke plant (case 1) and in a coke plant of the Ruhr district (case 2) contained the following impurities:

|  | G./Nm.$^3$ |
|---|---|
| NH$_3$ | 7.5 |
| H$_2$S | 5.0 |
| CO$_2$ | 43.4 |
| HCN | 2.0 | and was washed with ammoniacal liquor.

8 liters (case 1) and 6.5 liters (case 2), respectively, were removed from the washing liquid containing the following amounts of salts:

|  | Case 1 | Case 2 |
|---|---|---|
| Ammonium sulfate, g./l | 10 | 20 |
| Ammonium thiosulfate, g./l | 80 | 120 |
| Ammonium thiocyanate, g./l | 250 | 230 | and after heating to boiling temperature they were then added to the coal before charging into the coke oven.

After the coal was coked, the quantity of impurities in the coke oven gas amounted to:

|  | Case 1 | Case 2 |
|---|---|---|
| NH$^3$, g./Nm$^3$ | 10.4 | 8.9 |
| H$^2$S, g./Nm$^3$ | 6.7 | 8.5 |
| CO$^2$, g./Nm$^3$ | 46.5 | 45.7 |
| HCN, g./Nm$^3$ | 2.1 | 1.6 |

The sulfur content of the coke which had amounted without recycling the cited amount of washing medium to 0.96% in case 1 and 1.0% in case 2, was increased to 1.0% by weight in case 1 and to 1.05% by weight in case 2, respectively, on using the operating method of the invention.

According to the provisions of the patent statutes, we have explained the principle, preferred construction and mode of operation of our invention and have illustrated and described what we consider to represent its best embodiments. However, we desire to have it understood that, within the scope of the appended claims, the invention may be practiced otherwise than as specifically illustrated and described.

We claim:

1. A process for reducing the hydrogen sulfide content of a coke oven gas evolved during the coking of coal in a coke oven comprising, passing a coke oven gas evolved during the coking of coal in a coke oven through a liquid washing medium in a first stage and removing a substantial portion of the hydrogen sulfide from the gas, subjecting the liquid washing medium containing the hydrogen sulfide to an oxidizing medium to oxidize a substantial portion of the hydrogen sulfide in the liquid washing medium to elemental sulfur, separating the elemental sulfur from the liquid washing medium, recycling a major portion of the liquid washing medium after separating the elemental sulfur therefrom to said first stage to remove hydrogen sulfide from the coke oven gas evolved during the coking of coal in a coke oven, separating a minor portion of the liquid washing medium and subjecting said separated minor portion to an elevated temperature to volatilize certain volatile compounds, introducing said volatile compounds into a stream of coke oven gas evolved during the coking of coal in a coke oven prior to passing the coke oven gas through a liquid washing medium in said first stage, and mixing the residue of said minor portion of liquid washing medium wth coal to be coked in a coke oven.

2. A process for reducing the hydrogen sulfide content of a coke oven gas evolved during the coking of coal in a coke oven as set forth in claim 1 which includes, subjecting the liquid washing medium containing hydrogen sulfide to air in the presence of a catalyst to oxidize a substantial portion of the hydrogen sulfide to elemental sulfur and forming minor amounts of other sulfur compounds.

3. A process for reducing the hydrogen sulfide content of a coke oven gas evolved during the coking of coal in a coke oven as set forth in claim 2 which includes, subjecting the liquid washing medium containing hydrogen sulfide to air in the presence of a catalyst selected from the group consisting of hydroquinone, naphthoquinone, anthroquinone, sulfo acids of hydroquinone, naphthoquinone and anthroquinone and mixtures thereof.

4. A process for reducing the hydrogen sulfide content of a coke oven gas evolved during the coking of coal in a coke oven as set forth in claim 1 which includes, heating the minor portion of the liquid washing medium to an elevated temperature sufficient to volatilize certain volatile compounds and evaporate a substantial portion of the water therein, separating the evaporated water from the remaining residue of said minor portion of liquid washing medium.

5. A process for reducing the hydrogen sulfide content of a coke oven gas evolved during the coking of coal in a coke oven as set forth in claim 1 which includes, coking said mixture of coal and residue of said minor portion of liquid washing medium in a coke oven, converting a substantial portion of said sulfur compounds in said liquid washing medium portion of said mixture to a gas.

6. A process for reducing the hydrogen sulfide content of a coke oven gas evolved during the coking of coal in a coke oven as set forth in claim 5 which includes, converting a substantial portion of said sulfur compounds in said liquid washing medium portion of said mixture to hydrogen sulfide.

7. A process for reducing the hydrogen sulfide content of a coke oven gas evolved during the coking of coal in a coke oven as set forth in claim 1 in which, said minor portion of said liquid washing medium comprises about 0.01 $m.^3$ of liquid washing medium per metric ton of dry coal to be coked in a coke oven.

8. A process for reducing the hydrogen sulfide content of a coke oven gas evolved during the coking of coal in a coke oven as set forth in claim 1 which includes, washing the coke oven gas evolved from coking of a metric ton of dry coal in a coke oven with about 3 to 10 $m.^3$ of liquid washing medium, and separating as said minor portion of said liquid washing medium about 0.01 $m.^3$ from said 10 $m.^3$ of liquid washing medium.

References Cited

UNITED STATES PATENTS

| | | | |
|---|---|---|---|
| 2,718,868 | 9/1955 | Gorin et al. | 201—17 |
| 3,373,085 | 3/1968 | Masciantonio | 201—21 |
| 3,481,834 | 12/1969 | Squires | 201—20 |
| 2,819,950 | 1/1958 | Patton | 423—573 |
| 3,728,441 | 4/1973 | Hamblin | 423—573 |
| 2,919,976 | 1/1960 | Feagan | 423—574 |

NORMAN YUDKOFF, Primary Examiner

D. SANDERS, Assistant Examnier

U.S. Cl. X.R.

55—73; 201—17; 423—234, 563

UNITED STATES PATENT OFFICE
CERTIFICATE OF CORRECTION

Patent No. 3,840,653  Dated October 8, 1974

Inventor(s) Peter Diemer et al.

It is certified that error appears in the above-identified patent and that said Letters Patent are hereby corrected as shown below:

Column 3, line 42, after "washing" insert -- medium --.

Column 5, line 24, after "medium" delete "wth" and insert -- with --.

Signed and Sealed this sixteenth Day of December 1975

[SEAL]

Attest:

RUTH C. MASON
*Attesting Officer*

C. MARSHALL DANN
*Commissioner of Patents and Trademarks*